United States Patent
Hines (10) Patent No.: US 11,983,145 B2
(45) Date of Patent: May 14, 2024

(54) METHOD AND SYSTEM OF MODIFYING INFORMATION ON FILE

(71) Applicant: CDK GLOBAL, LLC, Hoffman Estates, IL (US)

(72) Inventor: Marc Hines, Portland, OR (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 0 days.

(21) Appl. No.: 17/823,930

(22) Filed: Aug. 31, 2022

(65) Prior Publication Data

US 2024/0070117 A1   Feb. 29, 2024

(51) Int. Cl.
 *G06F 16/14* (2019.01)
 *G06F 16/16* (2019.01)

(52) U.S. Cl.
 CPC .......... *G06F 16/164* (2019.01); *G06F 16/148* (2019.01)

(58) Field of Classification Search
 CPC ............................ G06F 16/164; G06F 16/148
 See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS xTime.com Web Pages, Jan. 8, 2015, 1 page.

(Continued)

*Primary Examiner* — Tarek Chbouki
(74) *Attorney, Agent, or Firm* — Stoel Rives LLP (57) ABSTRACT

Systems and computer-implemented methods and systems for modifying information in a document file are disclosed. An example computer-implemented method for modifying information in a document file includes: receiving a first text string; opening a file corresponding to the first text string, the file including binary data and text data; reading the text data; detecting a file location identifier in the text data; replacing a portion of the file location identifier with a second text string based on the first text string; and closing the file.

23 Claims, 8 Drawing Sheets

(56) References Cited

U.S. PATENT DOCUMENTS

| | | |
|---|---|---|
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Bellefeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 | 3/2003 | Bowman-Amuah |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 | 10/2003 | Bowman-Amuah et al. |
| 6,643,663 B1 | 11/2003 | Dabney et al. |
| 6,654,726 B1 | 11/2003 | Hanzek |
| 6,674,805 B1 | 1/2004 | Kovacevic et al. |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B1 | 4/2006 | Wane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |

(56) References Cited

U.S. PATENT DOCUMENTS

| | | |
|---|---|---|
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B1 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,122,716 B1 | 9/2015 | Naganathan et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,455,969 B1 | 9/2016 | Cabrera et al. |
| 9,477,936 B2 | 10/2016 | Lawson et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 9,983,982 B1 | 3/2018 | Kumar et al. |
| 10,032,139 B2 | 7/2018 | Adderly et al. |
| 10,083,411 B2 | 9/2018 | Kinsey et al. |
| 10,169,607 B1 | 1/2019 | Sheth et al. |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,509,696 B1 | 12/2019 | Gilderman et al. |
| 10,541,938 B1 | 1/2020 | Timmerman et al. |
| 10,552,871 B1 | 2/2020 | Chadwick |
| 10,657,707 B1 | 5/2020 | Leise |
| 11,080,105 B1 | 8/2021 | Birkett et al. |
| 11,117,253 B2 | 9/2021 | Oleynik |
| 11,190,608 B2 | 11/2021 | Amar et al. |
| 11,392,855 B1 | 7/2022 | Murakonda et al. |
| 11,468,089 B1 | 10/2022 | Bales et al. |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116197 A1 | 8/2002 | Erten |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 | 12/2002 | Patrick |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |

(56) References Cited

U.S. PATENT DOCUMENTS

| | | |
|---|---|---|
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0043614 A1 | 2/2005 | Huizenga et al. |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | McKay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1 | 9/2005 | Daniels et al. |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0004725 A1* | 1/2006 | Abraido-Fandino ... G06F 16/22 |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248205 A1 | 11/2006 | Randle et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1 | 12/2006 | Hasha et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2007/0299940 A1 | 12/2007 | Gbadegesin et al. |
| 2008/0010561 A1 | 1/2008 | Bay et al. |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0265648 A1 | 10/2012 | Jerome et al. |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0151468 A1 | 6/2013 | Wu et al. |
| 2013/0191445 A1 | 7/2013 | Gayman et al. |
| 2013/0204484 A1 | 8/2013 | Ricci |
| 2013/0226699 A1 | 8/2013 | Long |
| 2013/0317864 A1 | 11/2013 | Tofte et al. |
| 2013/0325541 A1 | 12/2013 | Capriotti et al. |
| 2013/0332023 A1 | 12/2013 | Bertosa et al. |
| 2014/0012659 A1 | 1/2014 | Yan |
| 2014/0026037 A1 | 1/2014 | Garb et al. |
| 2014/0052327 A1 | 2/2014 | Hosein et al. |
| 2014/0081675 A1 | 3/2014 | Ives et al. |
| 2014/0088866 A1 | 3/2014 | Knapp et al. |
| 2014/0094992 A1 | 4/2014 | Lambert et al. |
| 2014/0122178 A1 | 5/2014 | Knight |
| 2014/0136278 A1 | 5/2014 | Carvalho |
| 2014/0229207 A1 | 8/2014 | Swamy et al. |
| 2014/0229391 A1 | 8/2014 | East et al. |
| 2014/0244110 A1 | 8/2014 | Tharaldson et al. |

(56) References Cited

U.S. PATENT DOCUMENTS

| | | |
|---|---|---|
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0324536 A1 | 10/2014 | Cotton |
| 2014/0331301 A1 | 11/2014 | Subramani et al. |
| 2014/0337163 A1 | 11/2014 | Whisnant |
| 2014/0337825 A1 | 11/2014 | Challa et al. |
| 2014/0379530 A1 | 12/2014 | Kim et al. |
| 2014/0379817 A1 | 12/2014 | Logue et al. |
| 2015/0057875 A1 | 2/2015 | McGinnis et al. |
| 2015/0058151 A1 | 2/2015 | Sims et al. |
| 2015/0066781 A1 | 3/2015 | Johnson et al. |
| 2015/0066933 A1 | 3/2015 | Kolodziej et al. |
| 2015/0100199 A1 | 4/2015 | Kurnik et al. |
| 2015/0142256 A1 | 5/2015 | Jones |
| 2015/0142535 A1 | 5/2015 | Payne et al. |
| 2015/0207701 A1* | 7/2015 | Faaborg ............... H04L 67/52 709/224 |
| 2015/0227894 A1 | 8/2015 | Mapes, Jr. et al. |
| 2015/0248761 A1 | 9/2015 | Dong et al. |
| 2015/0254591 A1 | 9/2015 | Raskind |
| 2015/0268059 A1 | 9/2015 | Borghesani et al. |
| 2015/0268975 A1 | 9/2015 | Du et al. |
| 2015/0278886 A1 | 10/2015 | Fusz |
| 2015/0286475 A1 | 10/2015 | Vangelov et al. |
| 2015/0286979 A1 | 10/2015 | Ming et al. |
| 2015/0290795 A1 | 10/2015 | Oleynik |
| 2015/0334165 A1 | 11/2015 | Arling et al. |
| 2016/0004516 A1 | 1/2016 | Ivanov et al. |
| 2016/0059412 A1 | 3/2016 | Oleynik |
| 2016/0071054 A1 | 3/2016 | Kakarala et al. |
| 2016/0092944 A1 | 3/2016 | Taylor et al. |
| 2016/0132935 A1 | 5/2016 | Shen et al. |
| 2016/0140609 A1 | 5/2016 | Demir |
| 2016/0140620 A1 | 5/2016 | Pinkowish et al. |
| 2016/0140622 A1 | 5/2016 | Wang et al. |
| 2016/0148439 A1 | 5/2016 | Akselrod et al. |
| 2016/0162817 A1 | 6/2016 | Grimaldi et al. |
| 2016/0180358 A1 | 6/2016 | Battista |
| 2016/0180378 A1 | 6/2016 | Toshida et al. |
| 2016/0180418 A1 | 6/2016 | Jaeger |
| 2016/0267503 A1 | 9/2016 | Zakai-Or et al. |
| 2016/0275533 A1 | 9/2016 | Smith et al. |
| 2016/0277510 A1 | 9/2016 | Du et al. |
| 2016/0307174 A1 | 10/2016 | Marcelle et al. |
| 2016/0335727 A1 | 11/2016 | Jimenez |
| 2016/0337278 A1 | 11/2016 | Peruri et al. |
| 2016/0357599 A1 | 12/2016 | Glatfelter |
| 2016/0371641 A1 | 12/2016 | Wilson et al. |
| 2017/0034547 A1 | 2/2017 | Jain et al. |
| 2017/0039785 A1 | 2/2017 | Richter et al. |
| 2017/0053460 A1 | 2/2017 | Hauser et al. |
| 2017/0060929 A1 | 3/2017 | Chesla et al. |
| 2017/0064038 A1 | 3/2017 | Chen |
| 2017/0093700 A1 | 3/2017 | Gilley et al. |
| 2017/0124525 A1 | 5/2017 | Johnson et al. |
| 2017/0126848 A1 | 5/2017 | George et al. |
| 2017/0206451 A1 | 7/2017 | Jin et al. |
| 2017/0262894 A1 | 9/2017 | Kirti et al. |
| 2017/0293894 A1 | 10/2017 | Taliwal et al. |
| 2017/0308844 A1 | 10/2017 | Kelley |
| 2017/0308864 A1 | 10/2017 | Kelley |
| 2017/0308865 A1 | 10/2017 | Kelley |
| 2017/0316459 A1 | 11/2017 | Strauss et al. |
| 2017/0337573 A1 | 11/2017 | Toprak |
| 2017/0352054 A1 | 12/2017 | Ma et al. |
| 2017/0359216 A1 | 12/2017 | Naiden et al. |
| 2017/0364733 A1 | 12/2017 | Estrada et al. |
| 2018/0067932 A1* | 3/2018 | Paterson ............... G06F 16/156 |
| 2018/0173806 A1* | 6/2018 | Forstmann ............. G06F 9/448 |
| 2018/0300124 A1 | 10/2018 | Malladi et al. |
| 2019/0028360 A1 | 1/2019 | Douglas et al. |
| 2019/0073641 A1 | 3/2019 | Utke |
| 2019/0114330 A1* | 4/2019 | Xu ....................... G06F 16/168 |
| 2019/0213426 A1 | 7/2019 | Chen et al. |
| 2019/0294878 A1 | 9/2019 | Endras et al. |
| 2020/0050879 A1 | 2/2020 | Zaman et al. |
| 2020/0066067 A1 | 2/2020 | Herman et al. |
| 2020/0118365 A1 | 4/2020 | Wang et al. |
| 2020/0327371 A1 | 10/2020 | Sharma et al. |
| 2021/0072976 A1 | 3/2021 | Chintagunta et al. |
| 2021/0090694 A1 | 3/2021 | Colley et al. |
| 2021/0157562 A1 | 5/2021 | Sethi et al. |
| 2021/0184780 A1 | 6/2021 | Yang et al. |
| 2021/0224975 A1 | 7/2021 | Ranca et al. |
| 2021/0240657 A1* | 8/2021 | Kumar ............... G06F 11/1451 |
| 2021/0256616 A1 | 8/2021 | Hayard et al. |
| 2021/0303644 A1 | 9/2021 | Shear |
| 2021/0359940 A1 | 11/2021 | Shen et al. |
| 2022/0020086 A1 | 1/2022 | Kuchenbecker et al. |
| 2022/0028928 A1 | 1/2022 | Seo et al. |
| 2022/0208319 A1 | 6/2022 | Ansari et al. |
| 2022/0237084 A1* | 7/2022 | Bhagi ................. G06F 11/2097 |
| 2022/0293107 A1 | 9/2022 | Leaman et al. |
| 2022/0300735 A1 | 9/2022 | Kelly et al. |
| 2023/0214892 A1 | 7/2023 | Christian et al. |

OTHER PUBLICATIONS xTimes Newsletter, vol. 7, 2013, 4 pages.
Aloisio, Giovanni et al., Web-based access to the Grid using the Grid Resource Broker portal, Google, 2002, pp. 1145-1160.
Chadwick, D.W et al., Understanding X.500—The Directory, Available at <http://sec.cs.kent.ac.uk/x500book/>. Entire work cited., 1996.
Hogue, et al., Thresher: Automating the Unwrapping of Semantic Content from the World Wide Web, ACM, 2005, pp. 86-95.
Housel, Barron C. et al., WebExpress: A client/intercept based system for optimizing Web browsing in a wireless environment, Google, 1998, pp. 419-431.
Internet Archive Wayback Machine, archive of LDAP Browser. com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser. com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
An Appointment with Destiny—The Time for Web-Enabled Scheduling has Arrived, Link Fall, 2007, 2 pages.
IBM Tivoli Access Manager Base Administration Guide, Version 5.1. International Business Machines Corporation. Entire book enclosed and cited., 2003, 402 pgs.
NetFormx Offers Advanced Network Discovery Software, PR Newswire. Retrieved from http://www.highbeam.com/doc/1G1-54102907.html>., Mar. 15, 1999.
Openbay Announces First-of-its-Kind Connected Car Repair Service, openbay.com, Mar. 31, 2015, 14 pages.
Service Advisor, Automotive Dealership Institute, 2007, 26 pages.
Bedell, Doug et al., Dallas Morning News, "I Know Someone Who Knows Kevin Bacon". Oct. 27, 1998. 4 pgs.
Chatterjee, Pallab et al., On-board diagnostics not just for racing anymore, EDN.com, May 6, 2013, 7 pages.
Chen, Deren et al., Business to Business Standard and Supply Chain System Framework in Virtual Enterprises, Computer Supported Cooperative Work in Design, The Sixth International Conference on 2001, pp. 472-476.
Clemens Grelck, et al., A Multithread Compiler Backend for High-Level Array Programming, 2003.

(56) References Cited

OTHER PUBLICATIONS

CNY Business Journal, et al., Frank La Voila named Southern Tier Small-Business Person of 1999, ,Jun. 11, 1999 ,2 pages.
Croswell,Wayne et al., Service Shop Optimiztion, Modern Tire Retailer ,May 21, 2013 ,7 pages.
Davis,Peter T. et al.,Sams Teach Yourself Microsoft Windows NT Server 4 in 21 Days, Sams® Publishing, ISBN: 0-672-31555-6 , 1999, printed Dec. 21, 2008 , 15 pages.
Derfler,Frank J. et al., How Networks Work: Millennium Edition, Que, A Division of Macmillan Computer Publishing, ISBN: 0-7897-2445-6 ,2000 ,9 pages.
Drawbaugh,Ben et al., Automatic Link Review: an expensive way to learn better driving habits, Endgadget.com , Nov. 26, 2013 ,14 pages.
Emmanuel,Daniel et al., Basics to Creating an Appointment System for Automotive Service Customers, Automotiveservicemanagement.com ,2006 ,9 pages.
Hu,Bo et al., A Platform based Distributed Service Framework for Large-scale Cloud Ecosystem Development, IEEE Computer Society ,2015 ,8 pages.
Interconnection, et al., In Roget's II The New Thesaurus. Boston, MA: Houghton Mifflin http://www.credoreference.com/entry/hmrogets/interconnection ,2003, Retrieved Jul. 16, 2009 , 1 page.
Jenkins,Will et al., Real-time vehicle performance monitoring with data intergrity, A Thesis Submitted to the Faculty of Mississippi State University ,Oct. 2006 ,57 pages.
Johns,Pamela et al., Competitive intelligence in service marketing, Marketing Intelligence & Planning, vol. 28, No. 5 ,2010 ,pp. 551-570.
Lavrinc,Damon et al., First Android-powered infotainment system coming to 2012 Saab 9-3, Autoblog.com ,Mar. 2, 2011 ,8 pages.
Lee,Adam J. et al., Searching for Open Windows and Unlocked Doors: Port Scanning in Large-Scale Commodity Clusters, Cluster Computing and the Grid, 2005. IEEE International Symposium on vol. 1 ,2005 ,pp. 146-151.
Michener,J.R. et al., Managing System and Active-Content Integrity, Computer; vol. 33, Issue: 7 ,2000 ,pp. 108-110.
Milic-Frayling,Natasa et al., SmartView: Enhanced Document Viewer for Mobile Devices, Google ,Nov. 15, 2002 ,11 pages.
Needham,Charlie et al., Google Now Taking Appointments for Auto Repair Shops, Autoshopsolutions.com , Aug. 25, 2015 ,6 pages.
Open Bank Project, et al., https://www.openbankproject.com/, retrieved Nov. 23, 2020 ,10 pages.
openbay.com Web Pages, et al., Openbay.com, retrieved from archive.org May 14, 2019 ,Apr. 2015 ,6 pages.
openbay.com Web Pages, et al., Openbay.com, retrieved from archive.org on May 14, 2019 ,Feb. 2014 ,2 pages.
openbay.com Web Pages, et al., Openbay.com, retrieved from archive.org, May 14, 2019 ,Mar. 2015 ,11 pages.

\* cited by examiner

```
18 0 obj
... /URI (http://pc!4DE35.pdf) >>>>
Endobj
         \_____/ \____/
           602    604

18 0 obj
... /URI (http://coolmotors.com/2024/cars/4DE35.pdf) >>>>
Endobj
         \___________________/ \______/
                  606             604
```

METHOD AND SYSTEM OF MODIFYING INFORMATION ON FILE

BACKGROUND

The present disclosure relates to modification of information on a file. In particular, the present disclosure relates to modification of address information on a file.

Embedding a document file, such as a file in a portable document format (.pdf), in software applications and websites has proven to be an effective technique for sharing information with users of the software applications and visitors of the websites. However, when the information in the embedded document file becomes obsolete, the document file may need to be regenerated. If the information shared by the document file is similar, but not identical depending on target users and/or target subjects/objects of interests, the document file may need to be generated for each user/subject/object. Such regeneration of the document file or each generation of the document file for each user/subject/object using document creation/modification software is cumbersome and time consuming. Thus, more effective and efficient document modification and/or updating methods and tools are desired.

DETAILED DESCRIPTION

Various embodiments of the present disclosure will be explained below in detail with reference to the accompanying drawings. The following detailed description refers to the accompanying drawings that show, by way of illustration, specific aspects and embodiments of the disclosure. The detailed description includes sufficient detail to enable those skilled in the art to practice the embodiments of the disclosure. Other embodiments may be utilized, and structural, logical, and electrical changes may be made without departing from the scope of the present disclosure. The various embodiments disclosed herein are not necessary mutually exclusive, as some disclosed embodiments can be combined with one or more other disclosed embodiments to form new embodiments. Thus, the following more detailed description of the embodiments of the systems, methods, and apparatuses is not intended to limit the scope of the disclosure, but is merely representative of possible embodiments of the disclosure. In some cases, well-known structures, materials, or operations are not shown or described in detail.

The present disclosure provides various embodiments of replacing file location information in a document file. According to various embodiments, a portion of a file location information, such as a path, a combination of a path and a portion of a file name in a document file or a data file may be updated. For example, updating from an old path to a new path, updating a temporary path and a temporary file name to an actual path, or updating to a path name and a file name specific to a category or specific to a user may be performed. Without activating an application that accesses a complex file, such as a portable document file with a file extension .pdf, the file location information may be updated throughout the complex file, and/or across complex files.

Figure 1:
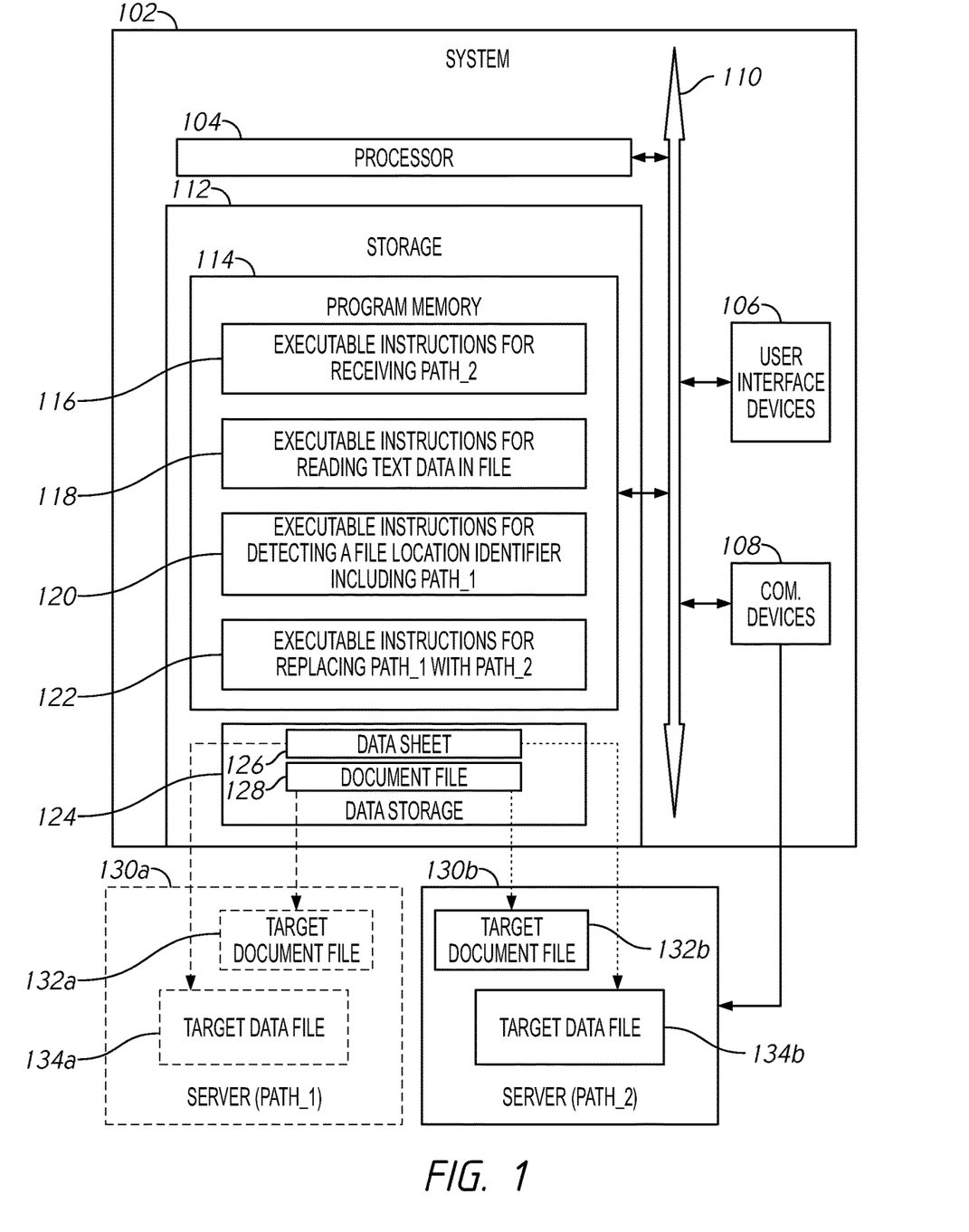
FIG. 1 is a block diagram of an example system of modifying information in a document file according to an embodiment of the present disclosure.

FIG. 1 is a block diagram of an example system 102 of modifying information in a document file according to an embodiment of the present disclosure. In some embodiments, the system 102 may be a computer including a processor 104, a storage 112, user interface devices 106, communication devices 108 and a bus 110. The processor 104 may access the storage 112, the user interface devices 106, and the communication devices 108 through the bus 110. The user interface devices 106 may include input devices that accept entries by a user, and output devices that provide information to the user. The input devices may include, for example, a mouse, a keyboard, a microphone and/or a camera. The output devices may include, for example, a display, one or more speakers, a printer, etc. The storage 112 may include program memory 114 that may store instructions to be executed by the processor 104. The storage 112 may also include a data storage 124 that may store data. The communication devices 108 may include hardware, software, or both providing one or more interfaces for communication (such as, for example, packet-based communication) between the system 102 and one or more other computers, such as a server 130*b* via one or more networks by wireless or wired internet/intranet communications. The wireless communications may include, for example, Wi-Fi, a cellular telecommunication such as CDMA, GSM, EV-DO, 3G, 4G, and 5G, etc., a short distance communication such as Bluetooth, near filed communications (NFC), etc. The wired communications may include communication via an Ethernet, etc.

The processor 104 may include hardware for executing instructions, such as those stored in the program memory 114 of the storage 112. The program memory 114 may include executable instructions that may be executed by the processor 104. In some embodiments, the executable instructions stored in the program memory 114 may include executable instructions for receiving path_2 116, executable instructions for reading text data in file 118, executable instructions for detecting a file location identifier including path_1 120, and executable instructions for replacing path_1 120 with path_2 122. In some embodiments, the executable instructions stored in the program memory 114 may be implemented as a file including a script code that executes file editing commands.

The processor 104 may perform replacement of path in a link in a file stored in the storage 112 from an old path PATH_1 to a new path PATH_2. For example, the file stored in the storage 112 may be a document file 128 or a data sheet 126. In some embodiments, the document file 128 may be a word format file with a file extension, such as .doc, .docx, .dot, a portable document file with a file extension .pdf, etc. In some embodiments, the data sheet 126 may have a file extension .xls. However, the file may be any file that includes text strings. In FIG. 1, the document file 128 and the data sheet 126 may include links to a target document file 132a and a target data file 134a on a server 130a, respectively. The links to the target document file 132a and the target data file 134a may include an old path PATH_1 that is a path indicative of a file location on the server 130a. In some embodiments, the server 130a may be an old server where these target data and document files are transferred from. In some embodiments, the server 130a may be an imaginary server and the old path PATH_1 may be an imaginary path or a temporary path that is a place holder in the data sheet 126 and/or the document file 128.

The path in the link is replaced with the new path PATH_2 that is a path indicative of a file location on the server 130b. After the replacement, the document file 128 may include a link to a target document file 132b and the data sheet 126 may include a link to a target data file 134b on the server 130b. In some embodiments, the server 130b may be a new server where these target data and document files are transferred to. In some embodiments, the server 130b may be a real server and the new path PATH_2 may be an actual path. In some embodiments, the new path PATH_2 may be provided from another application in the system 102. In some embodiments, the new path PATH_2 may be provided from another application on another computer that updates a path as a part of updating a system, which may be communicated via one of the communication devices 108. In some embodiments, the new path PATH_2 may be provided by an operator that may manually enter the new path PATH_2 using one of the user interface devices 106.

Figure 2:
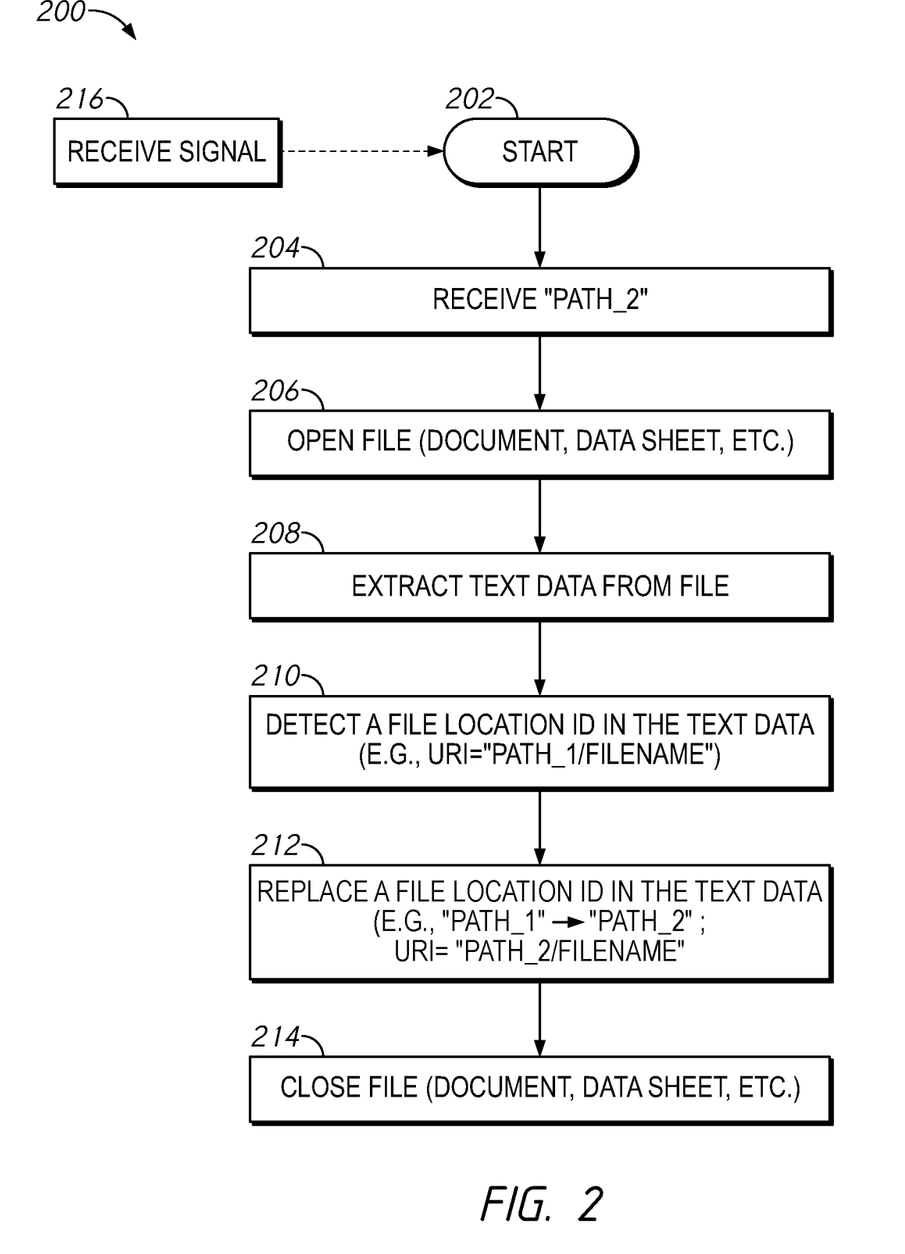
FIG. 2 is a flowchart of an example method of modifying information in a document file according to an embodiment of the present disclosure.

FIG. 2 is a flowchart of an example method 200 of modifying information in a document file according to an embodiment of the present disclosure. In some embodiments, the method 200 may be performed on the system 102 of FIG. 1. In some embodiments, the executable instructions stored in the program memory 114 may be implemented as a file including a script code that executes file editing commands. The method 200 may start at step 202 responsive to a signal received at step 216. In some embodiments, the signal may be received from a file manager application. For example, the file manager application may be an application either on the system 102 or on another computer providing the signal through the communication devices 108. In some embodiments, the file managing application may be implemented as a script including editing commands to instruct the processor 104 to perform replacement of file location information. The signal may be indicative of an update of a file location information due to files transferred from one server to another server. In some embodiments, the signal may be based on a user entry at the user interface devices 106. The user entry may be provided by an operator that may manually enter the new path PATH_2 using the user interface devices 106. Responsive to the signal, the processor 104 may perform the executable instructions for receiving path_2 116 to receive a new path PATH_2 at step 204.

The processor 104 may perform the executable instructions for reading text data in file 118 on the system 102. The processor 104 may open the file in step 206. For example, the file may be the document file 128 or the data sheet 126. The file may include data, including a text portion and a binary portion. The processor 104 may extract the text portion of the data in step 208. In some embodiments, the processor 104 may parse data in the file, interpret metadata in the parsed data, and extract text strings per the executable instructions for reading text data in file 118.

The processor 104 may perform the executable instructions for detecting a file location identifier including path_1 120 in step 210. In some embodiments, the processor 104 may further parse the extracted text strings and detect the file location identifier. For example, "I" signals that a tag follows after "/". Once the processor 104 detects "I" in the document file 128, then the processor 104 may detect a tag "URI" for a uniform resource identifier (URI) after "/". The tag "URI" may signal that a URI follows. After detecting the URI, the processor 104 may detect inside parentheses "(" and ")" as the file location identifier. In some embodiments, the file location identifier may include an application-layer protocol, such as "http://" indicative of the Hypertext Transfer Protocol (HTTP). A text string following the application-layer protocol may indicate a path and a file name of a target file. By using the file location identifier, a location of the old target file either inside or outside the system 102 may be addressed.

Figure 3A:
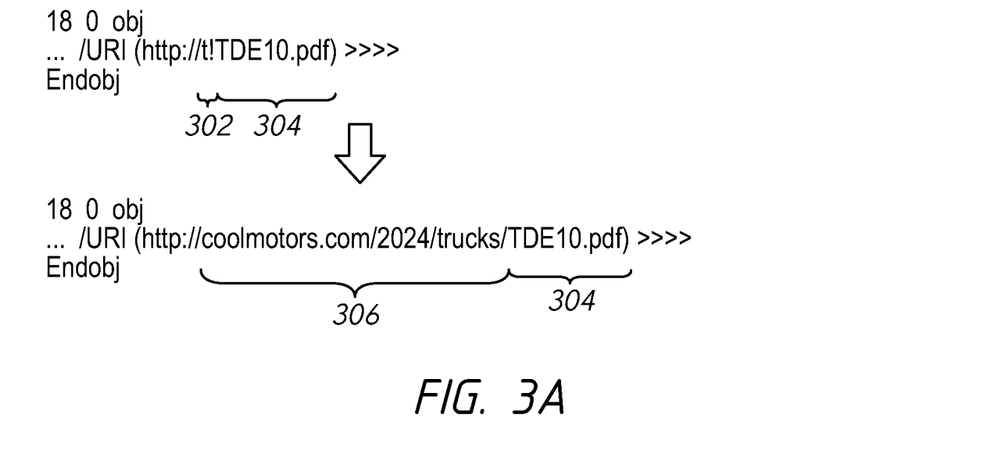
FIG. 3A shows an example of modification of information in a document file according to an embodiment of the present disclosure.

FIG. 3A is an example of modification of information in a document file 128 according to an embodiment of the present disclosure. For example, the processor 104 may detect a text string "http://t!TDE10.pdf" inside parentheses "("and")" as the file location identifier. Based on a separator (e.g., "!") between a path 302 and a file name 304, the processor 104 may also detect "t!" as the path 302 (e.g., PATH_1) and the file name 304 "TDE10.pdf."

The processor 104 may perform the executable instructions for replacing path_1 120 with path_2 122 in step 212. For example, the processor 104 may replace the path 302 "t!" with a new path 306 "sparkymotors.com/2023/." Then the document file 128 now includes an updated file location identifier that is a new URI, "http://sparkymotors.com/2023/TDE10.pdf" to identify a target file on a new server. After replacing the path 302 with the new path 306, the processor 104 may close the file in step 214.

Figure 3B:
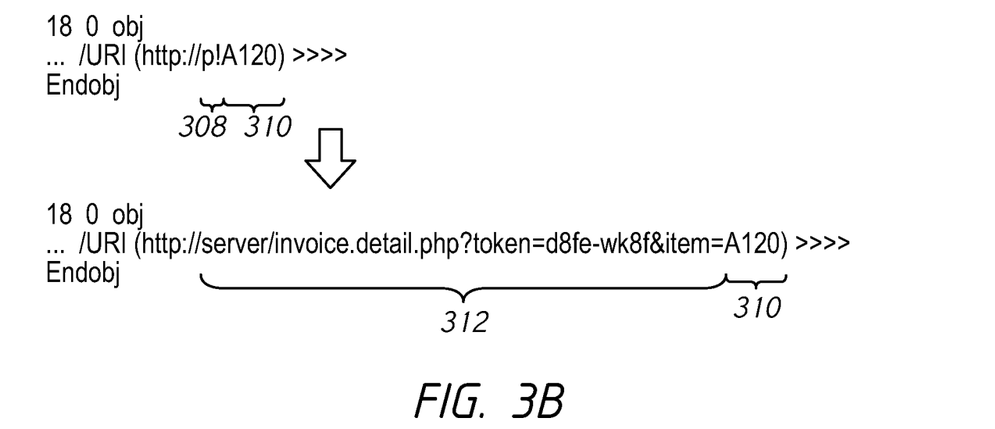
FIG. 3B shows an example of modification of information in a document file according to an embodiment of the present disclosure.

The scope of replacement may not be limited to a path. A combination of a path and a file name can be replaced. FIG. 3B is another example of modification of information in a document file 128 according to an embodiment of the present disclosure. For example, a text string "http://p!A120" inside parentheses "("and")" may be detected as the file location identifier. Based on a separator (e.g., "!") between a first portion 308 and a second portion 310 of the file location identifier, a text string "p!" may be detected as the first portion 308 of the file location identifier and a text string "A120" may be detected as the second portion 310 of the file location identifier.

The processor 104 may perform the executable instructions for replacing the first portion 308 of the file location identifier with a new first portion 312. For example, the processor 104 may replace the first portion 308 "p!" with the new first portion 312 "server/invoice.detail.php?token=d8fe-wk8f&item=." Then the document file 128 now includes an updated file location identifier that is a new URI, "http://server/invoice.detail.php?token=d8fe-wk8f&item=A120," to identify a target file on a new server.

The method 200 of modifying information in a document file has been described above. However, a scope of modifying information may not be limited to a single file. For example, a script describing the method 200 may access multiple files and perform the method 200 to replace file location information across the multiple files. Thus, file location changes common to several items within a single file or across multiple files may be performed by executing the script without having the application to access the multiple files.

Figure 4:
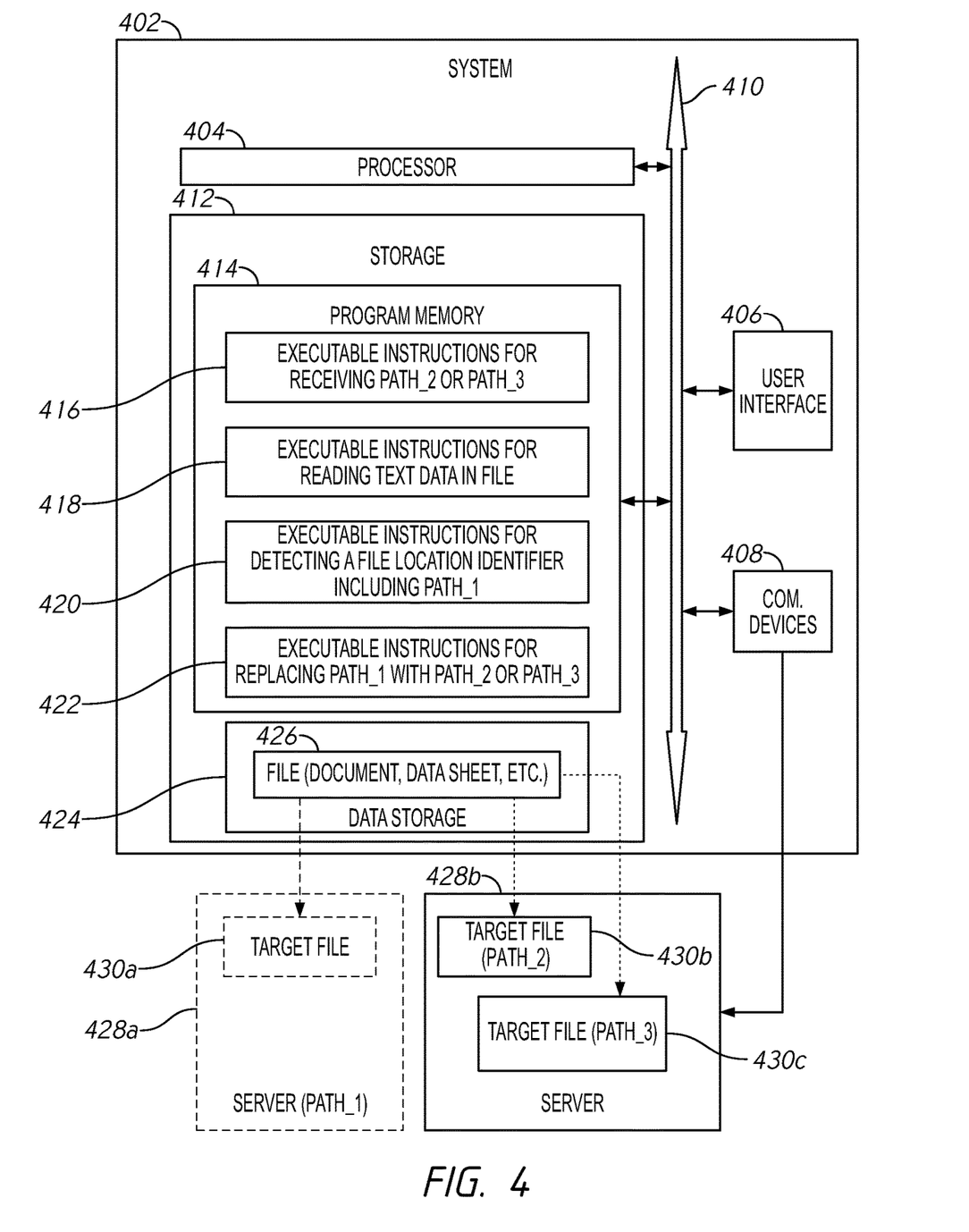
FIG. 4 is a block diagram of an example system of modifying information in a document file according to an embodiment of the present disclosure.

FIG. 4 is a block diagram of an example system 402 of modifying information in a document file according to an embodiment of the present disclosure. In some embodiments, the system 402 may be a computer including a processor 404, a storage 412, user interface devices 406, communication devices 408, and a bus 410. The processor 404, the storage 412, the user interface devices 406, the communication devices 408, and the bus 410 may include any of the features of the processor 104, the storage 112, the user interface devices 106, the communication devices 108, and the bus 110, respectively. Thus, a detailed description of functionalities of the processor 404, the storage 412, the user interface devices 406, the communication devices 408, and the bus 410, which have been previously described referring to FIG. 1, is therefore not repeated herein for brevity. The storage 412 may include a program memory 414 and a data storage 424.

The processor 404 may include hardware for executing instructions, such as those stored in the program memory 414 of the storage 412. The program memory 414 may include executable instructions that may be executed by the processor 404. In some embodiments, the executable instructions stored in the program memory 414 may include executable instructions for receiving path_2 or path_3 416, executable instructions for reading text data in file 418, executable instructions for detecting a file location identifier including path_1 420, and executable instructions for replacing path_1 420 with path_2 or path_3 422. In some embodiments, the executable instructions stored in the program memory 414 may be implemented as a file including a script code that executes file editing commands.

The processor 404 may perform replacement of path in a link in a file 426 stored in the data storage 424 from an old path PATH_1 to a new path PATH_2 or another new path PATH_3. For example, the file 426 stored in the data storage 424 may be a document file, a data sheet, etc. The file 426 may be any file that includes text strings. In FIG. 4, the file 426 may include a link to a target file 430a on a server 428a. The link to the target file 430a may include an old path PATH_1 that is a path indicative of a file location on the server 428a. In some embodiments, the server 428a may be an imaginary server and the old path PATH_1 may be an imaginary path or a temporary path that is a place holder in the file 426.

The path in the link is replaced with either the new path PATH_2 or PATH_3. The new path PATH_2 or PATH_3 may be an actual path or a permanent path. In some embodiments, the new paths PATH_2 and PATH_3 in FIG. 4 are located on the same server 428b; however, the new paths PATH_2 and PATH_3 may be located on different servers. After the replacement, the file 426 may include a link to a target file 430b including the new path PATH_2 or a link to a target file 430c including the new path PATH_3 depending on different conditions.

Figure 5:
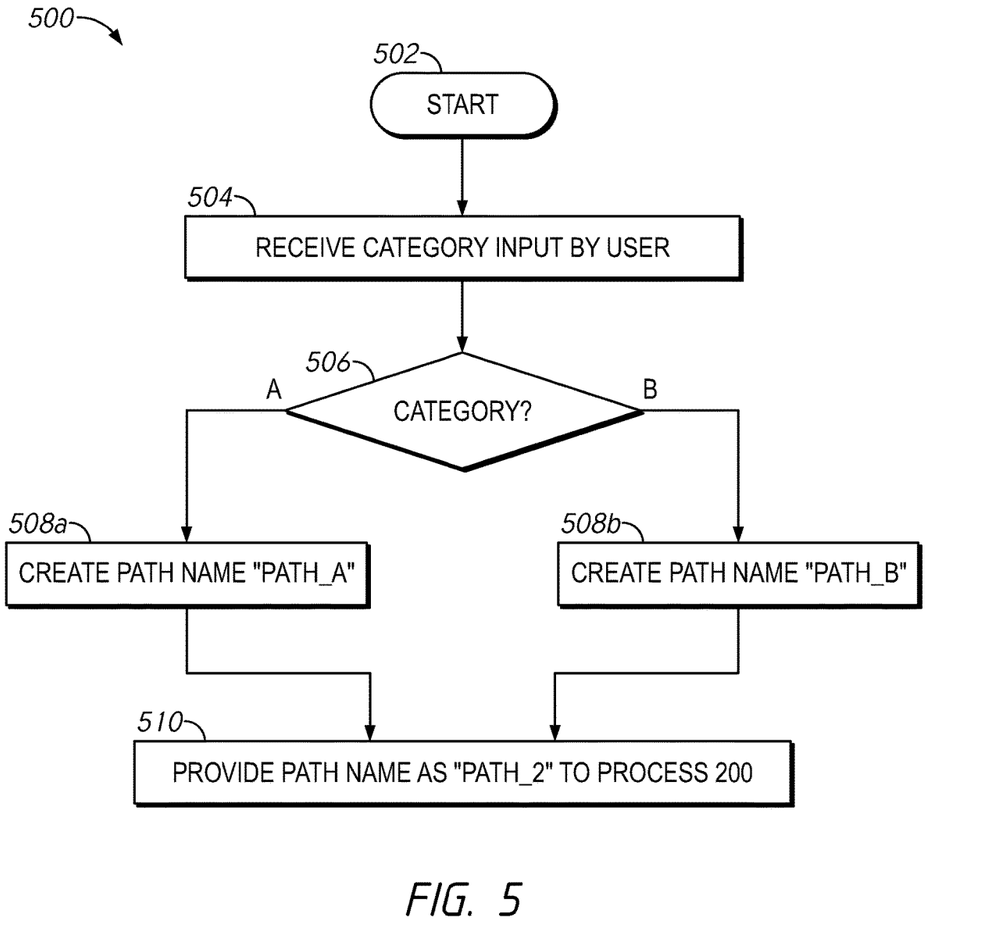
FIG. 5 is a flowchart of an example method of creating information for modification in a document file according to an embodiment of the present disclosure.

In some embodiments, the new paths PATH_2 and PATH_3 may be assigned based on an identifier of the user. FIG. 5 is a flowchart of an example method 500 of creating information for modification in a document file 426 according to an embodiment of the present disclosure. In some embodiments, the method 500 may be implemented in the executable instructions for receiving path_2 or path_3 416. The method 500 of creating information for modification starts in step 502 responsive to instructions in the executable instructions for receiving path_2 or path_3 416. In step 504, a user may access the system 402 by providing a target category of interest via the user interface devices 406. The system 402 may receive the user entry at the user interface devices 406.

In step 506, the processor 404 may determine what category has been entered by the user. If the category is A, then the processor 404 may proceed to perform step 508a. If the category is B, then the processor 404 may proceed to perform step 508b.

The processor 404 may create a path name based on the category. For example, if the category is "A," a text string "coolmotors.com/2024/trucks/" may be created in step 508a as a new path 306 of FIG. 3A. If the category is "B," a text string "coolmotors.com/2024/cars/" may be created in step 508b as a new path 602 of FIG. 6. In step 510, the processor 404 or the other processor outside the system 402 may provide the created path name as "PATH_2" to a process described as the method 200. In some embodiments, step 510 may be performed by modifying a path in a script including the executable instructions for receiving path_2 or path_3 416.

Figure 6:
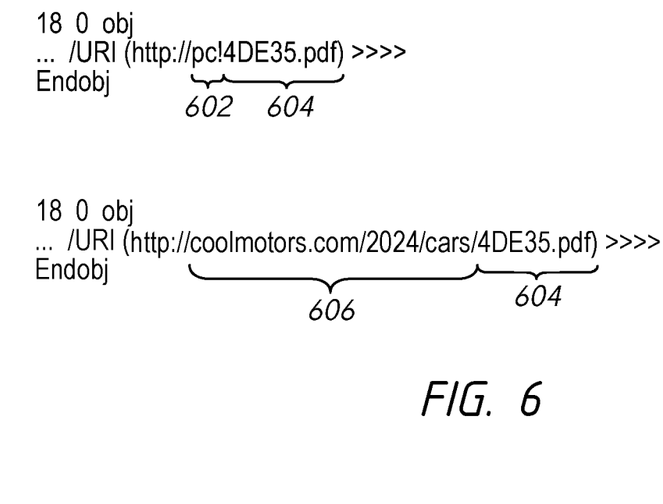
FIG. 6 shows an example of modification of information in a document file according to an embodiment of the present disclosure.

The processor 404 may perform the executable instructions for replacing the path 302 of the file location identifier with a new path 306. For example, the processor 404 may replace the path 302 "t!" with the new path 306 "coolmotors.com/2024/trucks/," if the identifier is "A." Then the file 426 now includes an updated file location identifier that is a new URI, "http://coolmotors.com/2024/trucks/TDE10.pdf." Thus, the file 426 accessed by the user choosing the category "A" will have access to a document file indicated by the new URI. For example, the processor 404 may replace the path 602 "pc!" with a new path 606 "coolmotors.com/2024/cars/," if the identifier is "B" while keeping a file name 604, "4DE35.pdf." Then the file 426 now includes an updated file location identifier that is a new URI, "http://coolmotors.com/2024/cars/4DE35.pdf." Thus, the file 426 accessed by the user choosing the category "B" will have access to a document file indicated by the new URI, different from the document file accessed by the user who chooses the category "A."

Figure 7:
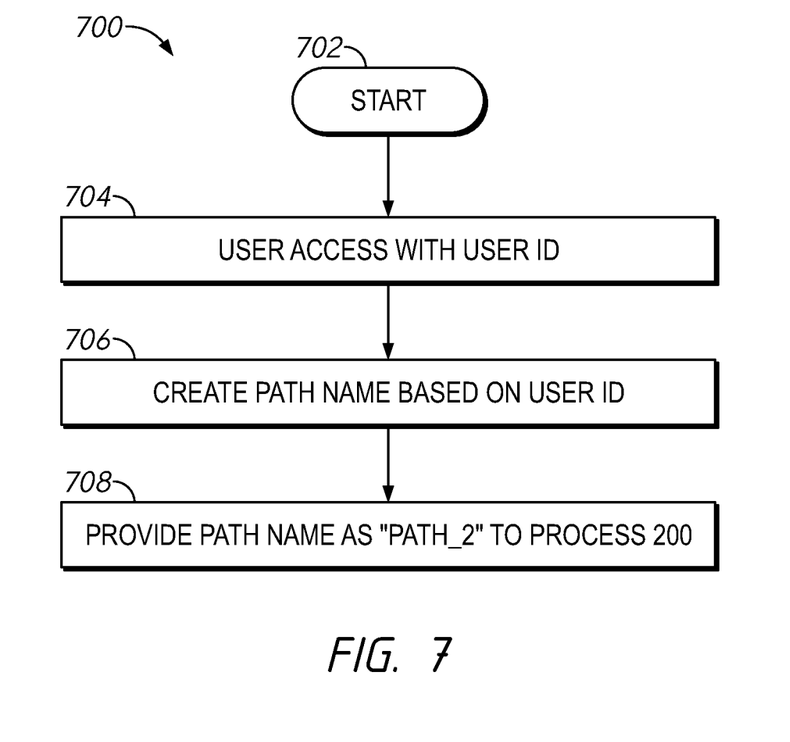
FIG. 7 is a flowchart of an example method of creating information for modification in a document file according to an embodiment of the present disclosure.

In some embodiments, the new paths PATH_2 and PATH_3 may be assigned based on an identifier of the user. FIG. 7 is a flowchart of an example method 700 of creating information for modification in a document file 426 according to an embodiment of the present disclosure. In some embodiments, the method 700 may be implemented in the executable instructions for receiving path_2 or path_3 416. The method 700 of creating information for modification starts in step 702 responsive to instructions in the executable instructions for receiving path_2 or path_3 416. In step 704, a user may access the system 402 by providing an identifier of the user via the user interface devices 406. In some embodiments, the identifier of the user may be provided by a manual entry of the user such as a combination of login ID and password, biometric information, scanning of an ID code (e.g., a barcode, QR code, alphanumerical code, etc.). The system 402 may receive the user entry at the user interface devices 406.

In step 706, the processor 404 may create a path name based on the identifier of the user. For example, if the identifier of the user is "d8fe-wk8f," a text string "server/invoice.detail.php?token=d8fe-wk8f&item=" may be created in step 706 as a new first portion 312 of FIG. 3B. If the identifier of the user is "9gk1-9wh4," a text string "server/invoice.detail.php?token=9gk1-9wh4&item=" may be created in step 706 as a new first portion 312 of FIG. 3B. In step 708, the processor 404 or the other processor outside the system 402 may provide the created path name as "PATH_2" to a process described as the method 200. In some embodiments, step 708 may be performed by modifying a path in a script including the executable instructions for receiving path_2 or path_3 416.

The processor 404 may perform the executable instructions for replacing the first portion 308 of the file location identifier with a new first portion 312. For example, the processor 404 may replace the first portion 308 "p!" with the new first portion 312 "server/invoice.detail.php?token=d8fe-wk8f&item=," if the identifier is "d8fe-wk8f." Then the file 426 now includes an updated file location identifier that is a new URI, "http://server/invoice.detail.php?token=d8fe-wk8f&item=A120." Thus, the file 426 accessed by the user with the identifier "d8fe-wk8f" will have access to an item indicated by the new URI. For example, the processor 404 may replace the first portion 308 "p!" with the new first portion 312 "server/invoice.detail.php?token=9gk1-9wh4&item=," if the identifier is "9gk1-9wh4." Then the file 426 now includes an updated file location identifier that is a new URI, "http://server/invoice.detail.php?token=9gk1-9wh4&item=A120." Thus, the file 426 accessed by the user with the identifier "9gk1-9wh4" will have access to an item indicated by the new URI, different from the item accessed by the user having the identifier "d8fe-wk8f."

FIGS. 5 and 7 described creating information for modifying the file location assigning the new paths PATH_2 and PATH_3 based on an item category or an identification of a user. However, the file location may be assigned based on some other information. For example, the new paths may be based on a time stamp of the location update (e.g., 2022, August), a time stamp of a user access, a location of a user (e.g., a region, a state, a country, a language), etc.

Figure 8:
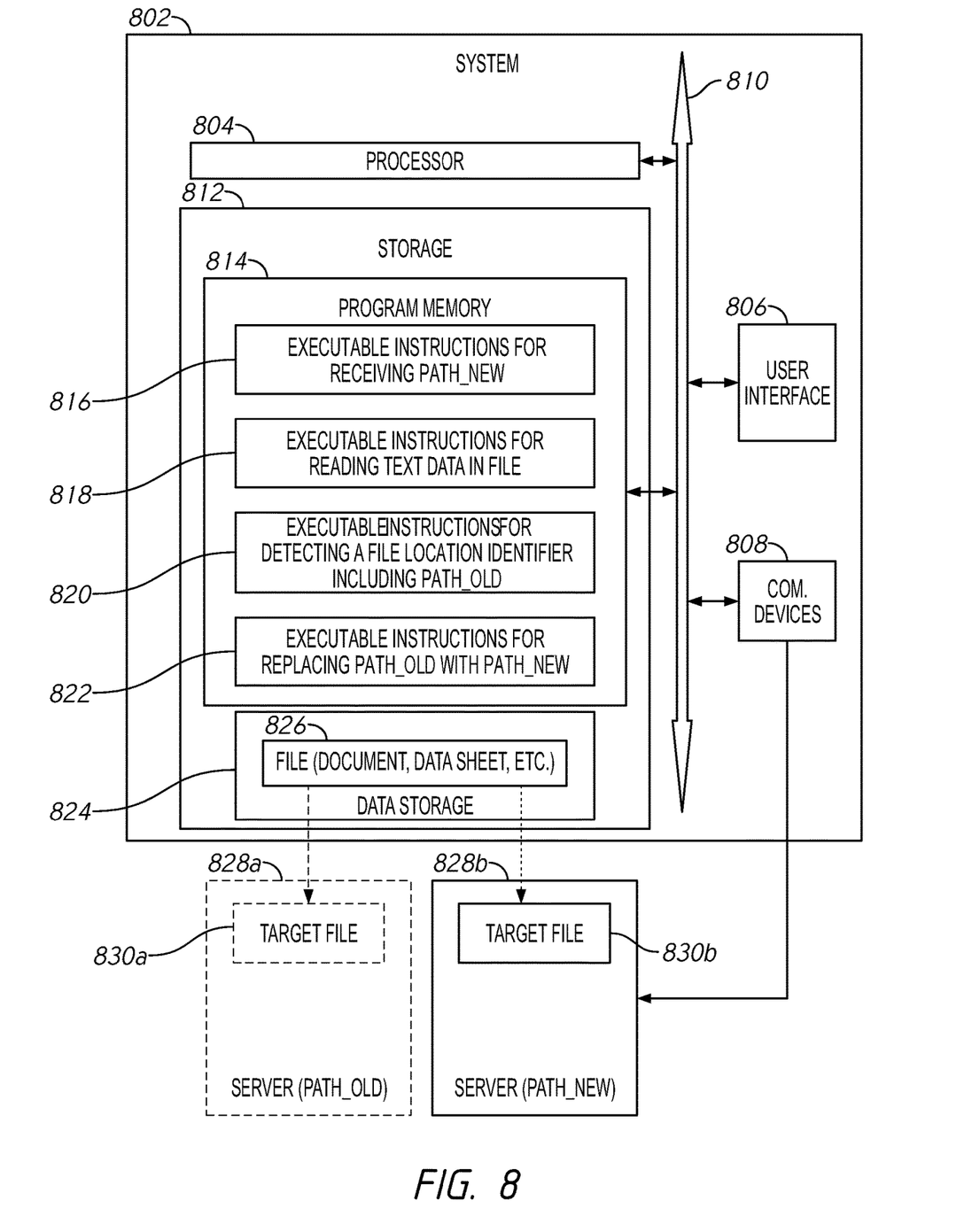
FIG. 8 is a block diagram of an example system of modifying information in a document file according to an embodiment of the present disclosure.

FIG. 8 is a block diagram of an example system 802 of modifying information in a document file according to an embodiment of the present disclosure. In some embodiments, the system 802 may be a computer including a processor 804, a storage 812, user interface devices 806, communication devices 808, and a bus 810. The processor 804, the storage 812, the user interface devices 806, the communication devices 808, and the bus 810 may include any of the features of the processor 104, the storage 112, the user interface devices 106, the communication devices 108, and the bus 110, respectively. Thus, a detailed description of functionalities of the processor 804, the storage 812, the user interface devices 806, the communication devices 808, and the bus 810, which have been previously described referring to FIG. 1, is therefore not repeated herein for brevity. The storage 812 may include a program memory 814 and a data storage 824.

The processor 804 may include hardware for executing instructions, such as those stored in program memory 814 of the storage 812. The program memory 814 may include executable instructions that may be executed by the processor 804. In some embodiments, the executable instructions stored in the program memory 814 may include executable instructions for receiving path_new 816, executable instructions for reading text data in file 818, executable instructions for detecting a file location identifier including path_old 820 and executable instructions for replacing path_old 820 with path_new 822. In some embodiments, the executable instructions stored in the program memory 814 may be implemented as a file including a script code that executes file editing commands.

The processor 804 may perform replacement of path in a link in a file 826 stored in the data storage 824 from an old path PATH_1 to a new path PATH_2. For example, the file 826 stored in the data storage 824 may be a document file, a data sheet, etc. The file 826 may be any file that includes text strings. In FIG. 8, the file 826 may include a link to a target file 830*a* on a server 828*a*. The link to the target file 830*a* may include an old path PATH_1 that is a path indicative of a file location on the server 828*a*. In some embodiments, the server 828*a* may be an old server where the target file 830*a* is outdated.

The path in the link is replaced with the new path PATH_2 that is a path indicative of a file location on a server 828*b*. After the replacement, the file 826 may include a link to a new target file 830*b* on the server 828*b*. In some embodiments, the server 828*b* may be a current server that is newer than the server 828*a* that stores files that are up-to-date.

Figure 9:
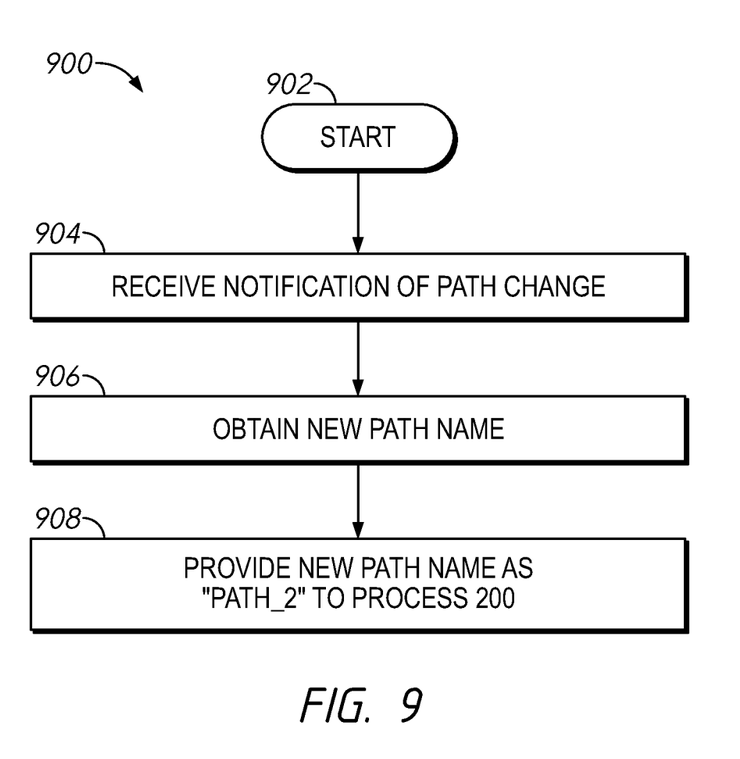
FIG. 9 is a flowchart of an example method of obtaining information for modification in a document file according to an embodiment of the present disclosure.

FIG. 9 is a flowchart of an example method 900 of obtaining information for modification in a document file 826 according to an embodiment of the present disclosure. In some embodiments, the method 900 may be implemented in the executable instructions for receiving path_new 816. The method 900 of creating information for modification starts in step 902 responsive to instructions in the executable instructions for receiving path_new 816. In some embodiments, a change to a new path may be notified by a file manager application on the same system or a different system in step 904 or from an operator manually.

In step 906, the processor 804 or another processor outside the system 802 may obtain a new path name responsive to the notification of the change to a new path. In step 908, the processor 804 or the other processor outside the system 802 may provide a new path name as "PATH_2" to a process described as the method 200. In some embodiments, step 908 may be performed by modifying a path in a script including the executable instructions for receiving path_new 816.

As described above, file location information in a document file may be replaced. A portion of file location information, such as a path, a combination of a path and a portion of a file name in a document file or a data sheet may be updated. Without activating an application that accesses a complex file including text data and binary data, such as a word document file, a portable document file, or a data sheet, the file location information may be updated throughout the complex file, and/or across complex files. Thus, updating from an old path to a new path, updating a temporary path and a temporary file name to an actual path, or updating to a path name and a file name specific to a category or specific to a user may be performed throughout the document file or the data sheet, or multiple files.

From the foregoing it will be appreciated that, although specific embodiments of the disclosure have been described herein for purposes of illustration, various modifications may be made without deviating from the spirit and scope of the disclosure. Accordingly, the scope of the disclosure should not be limited to any of the specific embodiments described herein.

What is claimed is:

1. A computer-implemented method of modifying information in a document file comprising:
   receiving a first text string;
   opening a file corresponding to the first text string, the file including binary data and text data;
   reading the text data;
   detecting a file location identifier in the text data, wherein detecting comprises,
      parsing the text data into two or more text strings, and
      identifying a third text string including a tag among the one or more text strings,
         wherein the tag indicates that a fourth text string following the third text string includes the file location identifier;
   replacing a portion of the file location identifier with a second text string based on the first text string; and
   closing the file.

2. The method of claim 1, wherein the portion of the file location identifier is indicative of a first file location and the second text string is indicative of a second file location newer than the first file location.

3. The method of claim 1, wherein the portion of the file location identifier is indicative of a temporary path and the second text string is indicative of a permanent path.

4. The method of claim 1, wherein the file is a portable document file (PDF).

5. The method of claim 1, further comprising receiving a signal indicative of a timing to update the portion of the file location identifier,
   wherein receiving the first text string and opening the file are performed responsive to the signal.

6. The method of claim 5, wherein receiving the signal is responsive to a change of a location of the file,
   wherein the second text string is indicative of a current location of the file.

7. The method of claim 5, wherein the second text string is based on an identifier of a user.

8. The method of claim 5, wherein the second text string is based on a category.

9. A non-transitory computer-readable medium storing executable instructions to perform a method of modifying information in a document file which, when executed by a processor, cause the processor to:
   receive a first text string;
   open a file corresponding to the first text string, the file including binary data and text data;
   read the text data;
   detect a file location identifier in the text data, including,
      parse the text data into two or more text strings; and
      identify a third text string including a tag among the one or more text strings,
         wherein the tag indicates that a fourth text string following the third text string includes the file location identifier;
   replace a portion of the file location identifier with a second text string based on the first text string; and
   close the file.

10. The non-transitory computer-readable medium of claim 9, wherein the portion of the file location identifier is indicative of a first file location and the second text string is indicative of a second file location newer than the first file location.

11. The non-transitory computer-readable medium of claim 9, wherein the portion of the file location identifier is indicative of a temporary path and the second text string is indicative of a permanent path.

12. The non-transitory computer-readable medium of claim 1, wherein the file is a portable document file (PDF).

13. The non-transitory computer-readable medium of claim 9, wherein the executable instructions which, when executed by the processor, cause the processor to further:
   receive a signal indicative of a timing to update the portion of the file location identifier,
   wherein the executable instructions which, when executed by the processor, cause the processor to receive the first text string and open the file responsive to the signal.

14. The non-transitory computer-readable medium of claim 13, wherein receiving the signal is responsive to a change of a location of the file, wherein the first text string is indicative of a current location of the file.

15. The non-transitory computer-readable medium of claim 13, wherein the second text string is based on an identifier of a user.

16. The non-transitory computer-readable medium of claim 13, wherein the second text string is based on a category.

17. A system comprising:
   one or more processors;
   a storage comprising:
      a data storage configured to store a file; and
      a program memory comprising executable instructions to perform a method of modifying information in the file which, when executed by the processor, cause the processor to:
         receive a first text string;
         open the file including binary data and text data;
         read the text data;
         detect a file location identifier in the text data, including,
            parse the text data into two or more text strings; and
            identify a third text string including a tag among the one or more text strings,
               wherein the tag indicates that a fourth text string following the third text string includes the file location identifier;
         replace a portion of the file location identifier with a second text string based on the first text string; and
         close the file.

18. The system of claim 17, wherein the portion of the file location identifier is indicative of a first file location and the second text string is indicative of a second file location newer than the first file location.

19. The system of claim 17, wherein the portion of the file location identifier is indicative of a temporary path and the second text string is indicative of a permanent path.

20. The system of claim 17, wherein the file is a portable document file (PDF).

21. The system of claim 17, wherein the executable instructions which, when executed by the processor, cause the processor to further:
   receive a signal indicative of a timing to update the portion of the file location identifier,
   wherein the executable instructions which, when executed by the processor, cause the processor to receive the first text string and open the file responsive to the signal.

22. The system of claim 21, wherein receiving the signal is responsive to a change of a location of the file,
   wherein the first text string is indicative of a current location of the file.

23. The system of claim 21, wherein the portion of the file location identifier is based on an identifier of a user.

\* \* \* \* \*